United States Patent [19]

Szczyrbowski et al.

[11] Patent Number: 5,279,722
[45] Date of Patent: Jan. 18, 1994

[54] METHOD FOR MANUFACTURING PANES WITH HIGH TRANSMISSIVITY IN THE VISIBLE RANGE OF THE SPECTRUM AND WITH HIGH REFLECTIVITY FOR THERMAL RADIATION

[75] Inventors: Joachim Szczyrbowski, Goldbach; Christoph Braatz, Hainburg; Anton Zmelty, Hoesbach, all of Fed. Rep. of Germany

[73] Assignee: Leybold Aktiengesellschaft, Hanau, Fed. Rep. of Germany

[21] Appl. No.: 839,349

[22] Filed: Feb. 20, 1992

[30] Foreign Application Priority Data

Oct. 30, 1991 [DE] Fed. Rep. of Germany ....... 4135701

[51] Int. Cl.$^5$ ............................................. C23C 14/34
[52] U.S. Cl. ..................... 204/192.27; 204/192.26
[58] Field of Search .................. 204/192.15, 192.22, 204/192.23, 192.26, 192.27, 192.28

[56] References Cited

U.S. PATENT DOCUMENTS

| | | | |
|---|---|---|---|
| 4,098,956 | 7/1978 | Blickensderfer et al. ... | 204/192.27 X |
| 4,534,841 | 8/1985 | Hartig et al. ............... | 204/192.27 X |
| 4,548,691 | 10/1985 | Dietrich et al. ............ | 204/192.27 |
| 4,790,922 | 12/1988 | Huffer ........................ | 204/192.27 |
| 4,938,857 | 7/1990 | Gillery ....................... | 204/192.27 |

FOREIGN PATENT DOCUMENTS

| | | |
|---|---|---|
| 0233003 | 8/1987 | European Pat. Off. . |
| 0283923 | 9/1988 | European Pat. Off. . |
| 2836943 | 2/1980 | Fed. Rep. of Germany . |
| 2931309 | 2/1980 | Fed. Rep. of Germany . |
| 288822 | 10/1983 | Fed. Rep. of Germany . |
| 3825671 | 3/1989 | Fed. Rep. of Germany . |
| 3941046 | 6/1990 | Fed. Rep. of Germany . |
| 2186001 | 8/1987 | United Kingdom . |

OTHER PUBLICATIONS

JP 63-238260 A., In: Patents Abstracts of Japan, C-563, Jan. 27, 1989, vol. 13, No. 39.

*Primary Examiner*—Nam Nguyen
*Attorney, Agent, or Firm*—Felfe & Lynch

[57] ABSTRACT

Method for the manufacture of panes with high transmissivity in the visible spectral range and with a high reflectivity for thermal radiation. The panes are coated by cathode sputtering. To the substrates S there is applied a first coating of a material of the oxide group $ZnO$, $SnO_2$, $In_2O_3$, $TiO_2$, $ZrO_2$, $TaO_5$, $SiO_2$, $Al_3O_3$, or mixtures thereof, or of one of the nitrides $AlN$, $Si_3N_4$ or their mixtures, or of aluminum oxynitride, titanium oxynitride, zirconium oxynitride or silicon oxynitride or their mixtures, in a thickness of 20 to 60 nm. A second layer 2 follows, of one of the metals Ag, Cu or mixtures thereof, in a thickness of 5 to 30 nm, a third layer 3 of one of the metals Pd or Pt or their mixtures, in a thickness of 0.2 to 5 nm, preferably 0.5 nm, and a fourth layer 4 which, as a metallic or suboxidic (less than stoichiometric) layer of one of the metals Ti, Cr or mixture thereof, or of an alloy with at least 15% of one of the metals, in a thickness of 0.5 to 5 nm, preferably 1.5 nm. Lastly, a fifth layer 5 is applied, of a metal that is the same as that of the first layer 1.

7 Claims, 1 Drawing Sheet

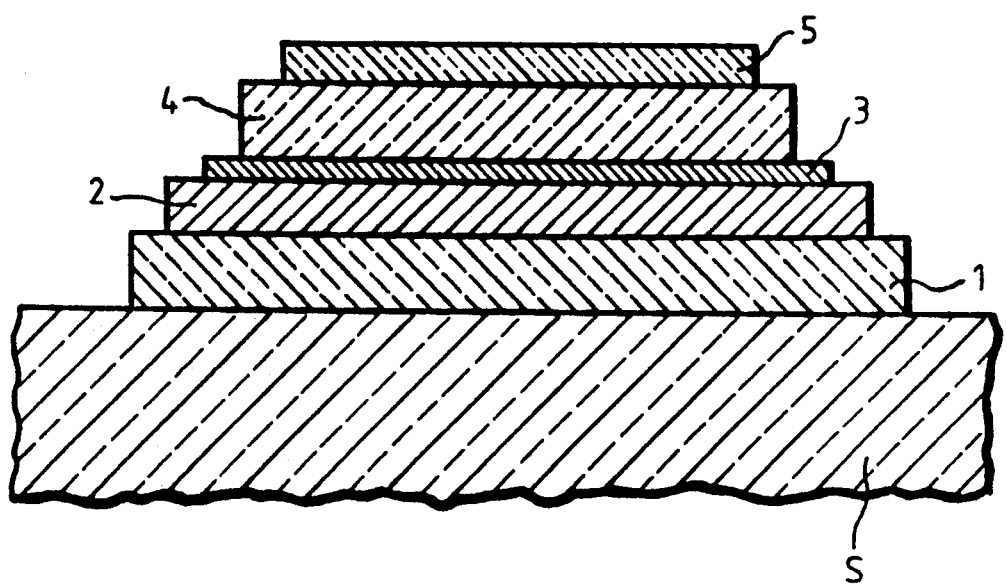

METHOD FOR MANUFACTURING PANES WITH HIGH TRANSMISSIVITY IN THE VISIBLE RANGE OF THE SPECTRUM AND WITH HIGH REFLECTIVITY FOR THERMAL RADIATION

BACKGROUND OF THE INVENTION

The invention relates to a method for the manufacture of panes with high transmissivity in the visible range of the spectrum and with high reflectivity for thermal radiation, by coating transparent substrates by cathode sputtering, and to panes manufactured by the method.

Such panes are intended, especially in winter, to prevent heat from being radiated away from a room to the outdoors. Suitable coating systems are generally referred to as "low-e" (low emissivity).

A low-e system of layers consists of various classes of coatings which have to have various properties and also to serve different purposes in this system:

a) In general, an electrically highly conductive layer, often a metal such as Ag, Au or Cu, with a very low emissivity coefficient, which is the actual low-e (low emissivity) coating.

b) Since, however, a metal layer has a high reflectivity for light (i.e., a low transmission of light) in the visible range, it is dereflectivized by means of additional transparent coatings. Another purpose of these transparent coatings is to assure a desired shade of color and a high mechanical strength and chemical resistance in the system.

c) In order to protect the thin metal layer against an aggressive ambient atmosphere both during the manufacturing process and after manufacture, and at the same time to assure good adherence of the next adjacent oxide coating, often a so-called blocking layer (barrier layer, adhesivizing layer) of metal or suboxide is applied to this metal layer.

In order to satisfy the above purposes, a low-e coating of the prior art has been built up as follows:

Substrate / Oxide / Silver / Blocker / Oxide.

The substrate is a transparent, inorganic or organic glass sheet or a transparent, organic film.

The silver is an electrically conductive layer.

The oxides form the anti-reflective coating, and

The blocker forms the protective coating for the silver layer and the adhesivizer for the oxide layer.

All of the low-e coating systems known heretofore react very sensitively to moisture, especially at elevated temperature such as during the summer months. Under such conditions the silver layer agglomerates and oxidizes, and for this reason dark specks form on the coating system. The metal blockers or suboxide blockers of metals such as Al, Cu, Cr, Zr, Ti, Ni, Zn, Ta and others or their alloys evidently do not sufficiently protect the present low-e system against corrosion.

A higher resistance of the low-e coating to sodium chloride is especially necessary if the manufactured panes are to be transported overseas. High resistance to sulfur dioxide, on the other hand, is necessary if the pane is to be used, for example, in heavy industrial regions where very high atmospheric pollution by sulfur dioxide prevails.

The low-e coatings known heretofore are mechanically soft and their chemical stability, especially against moisture (e.g., aqueous salt or sodium dioxide solutions), is unsatisfactory. Experience has shown that some of the known coating systems (U.S. Pat. No. 4,413,877, DE 33 07 661, EP 0 158 318, EP 0 226 993, U.S. Pat. No. 4,786,563) are completely destroyed within two hours under test conditions which are defined in DIN 50021 (NaCl test) or DIN 50018 ($SO_2$ test).

There are also low-e coating systems which do have satisfactory stability toward moisture (EP 0 304 234, U.S. Pat. No. 4,985,312). None of these coating systems, however, is sufficiently resistant to aqueous sodium chloride or aqueous sulfur dioxide (as established in standards DIN 50021 and DIN 50018).

SUMMARY OF THE INVENTION

It is the object of the present invention to create a low-e coating system with a very high resistance to moisture and to chemical attack.

This object is achieved according to the invention in that the silver metal layer, in a coating system of glass support/oxide/silver/oxide, is protected on one side or, better, on both sides, with a special blocker, namely, one that is composed of two layers, namely palladium or platinum and titanium or chromium or an alloy containing at least 15 atomic percent (at %) of one of the last two elements.

BRIEF DESCRIPTION OF THE DRAWING

The figure is a fragmentary cross-sectional view, to an enlarged scale, of a coating system in accordance with the invention.

DESCRIPTION OF PREFERRED EMBODIMENTS

Preferably, the silver metal coating in a layer system of glass support/oxide/Ag/oxide is protected on one or both sides with a blocker which is formed as a single layer of a mixture or an alloy of the elements platinum and/or palladium with titanium and/or chromium, or with an alloy containing at least 15 at % of one of the last two elements.

Such a coating system is advantageously built up as follows:

(1) Substrate / oxide / silver / palladium / titanium / oxide, or (2) Substrate / oxide / titanium / palladium / silver / palladium / titanium / oxide, or (3) Substrate / oxide / silver / titanium-palladium / oxide, or (4) Substrate / oxide / titanium-palladium / silver / titanium-palladium / oxide.

The thicknesses of the individual layers are as follows: first oxide layer approx. 40 nm, silver layer approx. 9 nm, palladium layer approx. 0.5 nm, titanium layer approx. 1 nm, titanium-palladium layer approx. 1 nm, and the final oxide layer approx. 38 nm.

In an exemplary embodiment wherein two blockers are provided, the thicknesses of the layers in the first blocker are best approximately equal to those in the second blocker. To improve the light transmission of the finished pane, the layers of the first and/or second blocker can advantageously be applied in suboxide (less than stoichiometric) form.

Surprisingly it has been found that such a blocker constitutes a very good adhesivizer between silver and the oxide layer. It has furthermore been found that a low-e coating system with the above-named two-layer blocker (layer system 1) or alloy blocker (layer system 3) is very resistant to moisture and aqueous sulfur dioxide solution. The chemical stability of the coating, especially against aqueous sulfur dioxide, is further improved in layer systems wherein the silver is protected with such a blocker on both sides (layer systems 2 and 4). Such coatings withstand tests according to DIN 50021 and DIN 50018 without any difficulty.

Panes in accordance with the invention can be made by applying the coatings in a vacuum with the aid of magnetron cathode sputtering. This process, used in pass-through apparatus, makes the coating of large panes of glass especially economical.

The production of the metal oxide layers by reactive magnetron cathode sputtering of metal or alloy targets can be performed in an atmosphere containing oxygen. The metal layers are applied by sputtering in an oxygen-free atmosphere. For slight modifications of the optical properties of the coatings it may advantageous to add small amounts of oxygen to the coating atmosphere.

EXAMPLE 1

In a sputtering apparatus equipped with a coating system for magnetron cathode sputtering, the following coatings were applied successively to a pane of float plate glass 2 mm thick, size 50×50 mm:

A zinc oxide coating by reactive sputtering of a zinc target in an argon-oxygen atmosphere at a pressure of $4 \times 10^{-3}$ mbar in a thickness of about 40 mm.

A silver layer with a thickness of 9 nm by sputtering a silver target in argon atmosphere at a pressure of $3 \times 10^{-3}$ mbar.

A palladium layer with a thickness of 0.3 nm by sputtering a palladium target in argon atmosphere at a pressure of $3 \times 10^{-3}$ mbar.

A titanium layer with a thickness of 1.5 nm by sputtering a titanium target in argon atmosphere at a pressure of $3 \times 10^{-3}$ mbar.

A tin-ytterbium oxide layer by the reactive sputtering of a tin-ytterbium target in an argon-oxygen atmosphere at a pressure of $4 \times 10^{-3}$ bar in a thickness of about 38 nm.

EXAMPLE 2

By means of the same sputtering apparatus the following coatings were applied successively to a float plate glass pane 2 mm thick, size 50×50 mm:

A zinc oxide coating by reactive sputtering of a zinc target in an argon-oxygen atmosphere at a pressure of $4 \times 10^{-3}$ mbar in a thickness of about 40 nm.

A silver coating 9 nm thick by sputtering a silver target in an argon atmosphere at a pressure of $3 \times 10^{-3}$ mbar.

A titanium-palladium coating 1.5 nm thick by sputtering a TiPd target in an argon atmosphere at a pressure of $3 \times 10^{-3}$ mbar.

A tin-ytterbium oxide coating by reactive sputtering of a SnYb target in an argon-oxygen atmosphere at a pressure of $4 \times 10^{-3}$ mbar in a thickness of about 38 nm.

EXAMPLE 3

In a sputtering apparatus of the same type the following coatings were applied successively to a float plate glass pane 2 mm thick, size 50×50 mm:

A zinc oxide coating by the reactive sputtering of a zinc target in an argon-oxygen atmosphere at a pressure of $4 \times 10^{-3}$ in a thickness of about 40 nm.

A titanium-palladium coating of a thickness of 0.6 nm by sputtering a titanium-palladium target in an argon atmosphere at a pressure of $3 \times 10^{-3}$ mbar.

A silver coating 9 nm thick by sputtering a silver target in an argon atmosphere at a pressure of $3 \times 10^{-3}$ mbar.

A titanium-palladium coating 1.5 nm thick by sputtering a titanium-palladium target in argon atmosphere at a pressure of $3 \times 10^{-3}$ mbar.

A tin-ytterbium oxide coating by the reactive sputtering of a tin-ytterbium target in an argon-oxygen atmosphere at a pressure of $4 \times 10^{-3}$ mbar in a thickness of about 38 nm.

EXAMPLE 4

In a sputtering apparatus of the same type the following coatings were applied successively to a float plate glass pane 2 mm thick measuring 50×50 mm:

A zinc oxide coating by the reactive sputtering of a zinc target in an argon-oxygen atmosphere at a pressure of $4 \times 10^{-3}$ mbar, in a thickness of about 40 nm.

A silver coating 9 nm thick by sputtering a silver target in an argon atmosphere at a pressure of $3 \times 10^{-3}$ mbar.

A titanium-palladium coating 1.5 nm thick by sputtering a titanium-palladium target in an argon atmosphere at a pressure of $3 \times 10^{-3}$ mbar.

A zinc oxide coating by reactive sputtering of a target in an argon-oxygen atmosphere at a pressure of $4 \times 10^{-3}$ mbar in a thickness of about 38 nm.

EXAMPLE 5

In a sputtering apparatus of the same type the following coatings were applied successively to a float plate glass pane 2 mm thick, size 50×50 mm:

A tin-ytterbium oxide coating by the reactive sputtering of a tin-ytterbium target in an argon-oxygen atmosphere at a pressure of $4 \times 10^{-3}$ mbar in a thickness of about 40 nm.

A silver coating 9 nm thick by sputtering a silver target in an argon atmosphere at a pressure of $3 \times 10^{-3}$ mbar.

A palladium coating 0.3 nm thick by sputtering a palladium target in an argon atmosphere at a pressure of $3 \times 10^{-3}$ mbar.

A titanium coating 1.5 nm thick by sputtering a titanium target in an argon atmosphere at a pressure of $3 \times 10^{-3}$ mbar.

A tin-ytterbium oxide coating by the reactive sputtering of a tin-ytterbium target in an argon-oxygen atmosphere at a pressure of $4 \times 10^{-3}$ mbar in a thickness of about 38 nm.

EXAMPLE 6

In a sputtering apparatus of the same type the following coatings were applied successively to a float plate glass disk 2 nm thick, size 50×50 mm:

A tin-ytterbium oxide coating by the reactive sputtering of a tin-ytterbium target in an argon-oxygen atmosphere at a pressure of $4 \times 10^{-3}$ mbar in a thickness of about 40 nm.

A titanium coating of a thickness of 0.7 nm by sputtering a titanium target in an argon atmosphere at a pressure of $3 \times 10^{-3}$ mbar.

A palladium coating 0.3 nm thick by sputtering a palladium target in an argon atmosphere at a pressure of $3 \times 10^{-3}$ mbar.

A silver coating 9 nm thick by sputtering a silver target in an argon atmosphere at a pressure of $3 \times 10^{-3}$ mbar.

A palladium coating 0.3 nm thick by sputtering a palladium target in an argon atmosphere at a pressure of $3 \times 10^{-3}$ mbar.

A titanium coating 1.5 nm thick by sputtering a titanium target in an argon atmosphere at a pressure of $3 \times 10^{-3}$ mbar.

A tin-ytterbium oxide coating by the reactive sputtering of a tin-ytterbium target in an argon-oxygen atmosphere at a pressure of $4 \times 10^{-3}$ mbar in a thickness of about 38 nm.

EXAMPLE 7

In a sputtering apparatus of the same type the following coatings were applied successively to a float plate glass pane 2 mm thick, size $50 \times 50$ mm.

A tin-ytterbium oxide coating by reactive sputtering of a tin-ytterbium target in an argon-oxygen atmosphere at a pressure of $4 \times 10^{-3}$ mbar in a thickness of about 40 nm.

A silver coating 9 nm thick by sputtering a silver target in an argon atmosphere at a pressure of $3 \times 10^{-3}$ mbar.

A titanium coating 1.5 nm thick by sputtering a titanium target in an argon atmosphere at a pressure of $3 \times 10^{-3}$ mbar.

A tin-ytterbium oxide coating by reactive sputtering of a tin-ytterbium target in an argon-oxygen atmosphere at a pressure of $4 \times 10^{-3}$ mbar in a thickness of about 38 nm.

EXAMPLE 8

In a sputtering apparatus of the same type the following coatings were successively applied to a float glass pane 2 nm thick, size $50 \times 50$ mm:

A tin-ytterbium oxide coating by reactive sputtering of a tin-ytterbium target in an argon-oxygen atmosphere at a pressure of $4 \times 10^{-3}$ mbar in a thickness of about 40 nm.

A titanium-palladium coating 0.6 nm thick by sputtering a titanium-palladium target in an argon atmosphere at a pressure of $3 \times 10^{-3}$ mbar.

A silver coating 9 nm thick by sputtering a silver target in an argon atmosphere at a pressure of $3 \times 10^{-3}$ mbar.

A titanium-palladium coating 1.5 nm thick by sputtering a titanium-palladium target in an argon atmosphere at a pressure of $3 \times 10^{-3}$ mbar.

A tin-ytterbium oxide coating by the reactive sputtering of a tin-ytterbium target in an argon-oxygen atmosphere at a pressure of $4 \times 10^{-3}$ mbar in a thickness of about 38 nm.

EXAMPLE 9

In a sputtering apparatus of the same type the following coatings were successively applied to a float glass plate 2 mm thick, size $50 \times 50$ mm:

A tin-ytterbium oxide coating by the reactive sputtering of a tin-ytterbium target in an argon-oxygen atmosphere at a pressure of $4 \times 10^{-3}$ mbar in a thickness of about 40 nm.

A titanium-palladium coating 0.8 nm thick by sputtering a titanium-palladium target in an argon atmosphere at a pressure of $3 \times 10^{-3}$ mbar.

A silver coating 9 nm thick by sputtering a silver target in an argon atmosphere at a pressure of $3 \times 10^{-3}$ mbar.

A titanium-palladium coating 1.5 nm thick by sputtering a titanium-palladium target in an argon atmosphere at a pressure of $3 \times 10^{-3}$ mbar.

A tin-ytterbium oxide coating by reactive sputtering of a tin-ytterbium target in an argon-oxygen atmosphere at a pressure of $4 \times 10^{-3}$ mbar in a thickness of about 38 nm.

EXAMPLE 10

In a sputtering apparatus of the same type the following coatings were applied successively to a float plate glass pane 2 mm thick, size $50 \times 50$ mm:

A zinc oxide coating by reactive sputtering of a zinc target in an argon-oxygen atmosphere at a pressure of $4 \times 10^{-3}$ mbar in a thickness of about 40 nm.

A silver coating 9 nm thick by sputtering a silver target in an argon atmosphere at a pressure of $3 \times 10^{-3}$ mbar.

A titanium coating 1.5 nm thick by sputtering a titanium target in an argon atmosphere at a pressure of $3 \times 10^{-3}$ mbar.

A zinc oxide coating 1.5 nm thick by sputtering a zinc target in an argon-oxygen atmosphere at a pressure of $4 \times 10^{-3}$ mbar in a thickness of about 38 nm.

EXAMPLE 11

In a sputtering apparatus of the same type the following coatings were successively applied to a float glass pane 2 nm thick, size $50 \times 50$ mm:

A zinc oxide coating by reactive sputtering of a zinc target in an argon-oxygen atmosphere at a pressure of $4 \times 10^{-3}$ mbar in a thickness of about 40 nm.

A silver coating 9 nm thick by sputtering a silver target in an argon atmosphere at a pressure of $3 \times 10^{-3}$ mbar.

A titanium coating 1.5 nm thick by sputtering a titanium target in an argon atmosphere at a pressure of $3 \times 10^{-3}$ mbar.

A tin-ytterbium oxide coating by reactive sputtering of a tin-ytterbium target in an argon-oxygen atmosphere at a pressure of $4 \times 10^{-3}$ mbar in a thickness of about 38 nm.

EXAMPLE 12

In a sputtering apparatus of the same type the following coatings were applied successively to a float plate glass pane 2 mm thick, size $50 \times 50$ mm:

A tin-ytterbium oxide coating by reactive sputtering of a tin-ytterbium target in an argon-oxygen atmosphere at a pressure of $4 \times 10^{-3}$ mbar in a thickness of about 40 nm.

A silver coating 9 nm thick by sputtering a silver target in an argon atmosphere at a pressure of $3 \times 10^{-3}$ mbar.

A titanium coating 1.5 nm thick by sputtering a titanium target in an argon atmosphere at a pressure of $3 \times 10^{-3}$ mbar.

A tin-ytterbium oxide coating by reactive sputtering of a tin-ytterbium target in an argon-oxygen atmosphere at a pressure of $4 \times 10^{-3}$ mbar in a thickness of about 38 nm.

The coating systems produced were then tested for resistance to moisture, sodium chloride and sulfur dioxide. The procedures of the individual tests are as follows: cl Salt Spray Test Test in accordance with DIN 50021 and ASTM B-117-79. The samples were exposed to an indirect salt water fog containing 5% NaCl. The temperature of the solution is 25° C., that of the chamber 35° C. The duration of the test is 24 hours.

SO₂ Test

Test according to DIN 50018. In this test, 0.2 liter of $SO_2$ was dissolved in 2 liters of distilled water. The samples were exposed to this atmosphere for 8 hours at a temperature of 40° C. After that the samples were left in the open sample chamber to cool down to room temperature.

Dampness Test

In this test the samples were exposed for 48 hours to a temperature of 55° C. and to a relative atmospheric humidity of 85%. Starting out from room temperature and moisture these conditions were reached in a half hour. Test apparatus is a climate test booth made by Heraeus Vötsch.

The results were evaluated according to the following scoring:

Salt Spray and SO₂ Test

1: Not attacked
2: Damage less than 1% (D<1%)
3: Damage of 1-5% (1%<D<5%)
4: Damage of 5-25% (5%<D<25%)
5: Coating still present but easily wiped off
6: Coating can be rinsed off with water

Dampness Test

1: Not attacked
2: Damage less than 1% (S<1%)
3: Damage 1 to 5% (1%<S<5%)
4: Damage 5 to 25% (5%<S<25%)
5: Damage 25 to 50% (25%<S<50%)
6: Damage more than 50% (50%<S)

The results are summarized in the following table where Ty (%) means the transmission in the entire visible light spectrum:

| | COATING | | | | | | STABILITY | | |
|---|---|---|---|---|---|---|---|---|---|
| No. | Oxide | Blocker | Ag | Blocker | Oxide | Ty (%) | Moisture | NaCl | SO₂ |
| 1 | ZnO | — | — Ag | Pd Ti | SnYbO₂ | 85.5 | 1.2 | 1.3 | 6.0 |
| 2 | ZnO | — | — Ag | TiPd | SnYbO₂ | 85.5 | 1.0 | 1.1 | 6.0 |
| 3 | ZnO | TiPd | Ag | TiPd | SnYbO₂ | 82.5 | 1.0 | 1.1 | 3.0 |
| 4 | ZnO | — | — Ag | TiPd | ZnO | 84.0 | 1.1 | 1.4 | 6.0 |
| 5 | SnYbO₂ | — | — Ag | Pd Ti | SnYbO₂ | 85.0 | 1.5 | 6.0 | 6.0 |
| 6 | SnYbO₂ | Ti Pd | Ag | Pd Ti | SnYbO₂ | 84.0 | 1.0 | 1.0 | 1.4 |
| 7 | SnYbO₂ | — | — Ag | TiPd | SnYbO₂ | 84.5 | 1.0 | 2.5 | 5.0 |
| 8 | SnYbO₂ | TiPd | Ag | TiPd | SnYbO₂ | 84.5 | 1.0 | 1.1 | 1.8 |
| 9 | SnYbO₂ | TiPd | Ag | TiPd | SnYbO₂ | 83.0 | 1.0 | 1.0 | 1.2 |
| Samples tested for comparison | | | | | | | | | |
| 10 | ZnO | — | — Ag | Ti | — ZnO | 86.0 | 1.9 | 4.0 | 6.0 |
| 11 | ZnO | — | — Ag | Ti | — SnYbO₂ | 86.0 | 4.5 | 6.0 | 6.0 |
| 12 | SnYbO₂ | — | — Ag | Ti | — SnYbO₂ | 85.0 | 4.0 | 6.0 | 6.0 |

In the appended drawing a substrate is represented which is formed of a plate of mineral glass. On the substrate S there is a first layer 1 with a thickness of 20 to 6 nm consisting of a material of the oxide group: ZnO, $SnO_2$, $In_2O_3$, $TiO_2$, $ZrO_2$, $Ta_2O_5$, $SiO_2$, $Al_3O_3$ or mixtures thereof, or of one of the nitrides, AlN, $Si_3N_4$ or their mixtures, or of aluminum oxynitride, titanium oxynitride, zirconium oxynitride or silicon oxynitride, or mixtures thereof.

To this coating is applied a second layer 2 of one of the metals Ag, Cu or mixtures thereof with a thickness of 5 to 30 nm.

To this coating is applied a third layer 3 of one of the metals Pd or Pt or mixtures thereof in a thickness of 0.2 to 5 nm.

To this third coating is applied a fourth layer 4 which is a metal or suboxidic coating of one of the metals, Ti, Cr, or mixtures thereof, or an alloy containing at least 15% of one of the metals, in a thickness of 0.5 to 5 nm.

Lastly, a fifth layer 5 of the same material as used in the first coating 1 is applied to the fourth layer.

All of the coatings 1 to 5 are applied by a cathode sputtering process which in itself is state of the art.

A pane in accordance with the invention has a light transmission of at least 40%, preferably 85%, and a reflectivity in the thermal radiation range (λ approx. 8 μm) of at least 80%, preferably about 90%.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Method for manufacturing panes of high transmissivity in the visible range of the spectrum and with a high reflectivity for thermal radiation, comprising:
   coating transparent substrates by cathode sputtering, to form
   a first layer of a material selected from the oxide group consisting of ZnO, $SnO_2$, $In_2O_3$, $TiO_2$, $ZrO_2$, $Ta_2O_5$, $SiO_2$, $Al_3O_3$ and mixtures thereof and the nitride selected from the group consisting of AlN, $Si_3N_4$ and mixtures thereof and oxynitride selected from the group consisting of aluminum oxynitride, titanium oxynitride, zirconium oxynitride and silicon oxynitride and mixtures thereof, with a thickness of 20 nm to 60 nm,
   a second layer of a metal selected from the group consisting of Ag, Cu and mixtures thereof, with a thickness of 5 to 30 nm,
   a third layer of a metal selected from the group consisting of Pd, Pt and mixtures thereof, with a thickness of 0.2 to 5 nm,
   a fourth layer of a material selected from the group consisting of a metal Ti, Cr and a mixture and suboxides thereof, in a thickness of 0.5 to 5 nm, and
   a fifth layer of a material that is the same as the first layer.

2. Method according to claim 1, which includes applying at least one of the oxide layers in a reactive atmosphere of inert gas and oxygen ($O_2$), the nitride layers in a reactive atmosphere of inert gas and nitrogen ($N_2$), the oxynitride layers in a reactive atmosphere of inert gas, oxygen ($O_2$) and nitrogen ($N_2$), and applying the metal layers in an inert atmosphere.

3. Method according to claim 1, in which the oxide layers are selected from the group consisting of $SnO_2$ and $In_2O_3$ and their mixed oxides with a content selected from the group consisting of Mg oxide, Al oxide, P oxide, Ti oxide, Y oxide, Zr oxide, and Ta oxide of 0 to 20 at % and one of the oxides of the elements with the atomic number 57 to 71 of the periodic table from a range of 0 to 5 at %.

4. Method according to claim 1, in which the zinc oxide layer is formed with a content of aluminum oxide of 0 to 10 at %.

5. Method according to claim 1, which includes sputtering the layers from a metal target.

6. Method according to claim 1, which includes sputtering the oxide layers selected from the group consisting of ZnO, $SnO_2$ and $In_2O_3$ and their mixed oxides from a target of a material selected from the group consisting of metal and metal alloy of the base elements with an admixture of at least one of the elements with the atomic number 57 to 71 of the periodic table and with a content of Al.

7. Method in accordance with claim 1 which comprises forming on the first layer and between the first layer and the second layer a first additional layer of a material selected from the group consisting of Ti, Cr and a mixture and suboxides thereof, in a thickness of 0.5 to 5 nm, and forming on the first additional layer a second additional layer of a metal selected from the group consisting of Pd, Pt and mixtures thereof, with a thickness of 0.2 to 5 nm.

* * * * *